United States Patent Office 3,819,806
Patented June 25, 1974

3,819,806
FACILITATED TRANSPORT OF HYDROGEN SULFIDE

William J. Ward III and Robert M. Salemme, Schenectady, N.Y., and Jerome F. Mayer, Cambridge, Mass., assignors to General Electric Company
No Drawing. Filed Apr. 20, 1972, Ser. No. 245,893
Int. Cl. B01d 53/34
U.S. Cl. 423—220
3 Claims

ABSTRACT OF THE DISCLOSURE

In an immobilized liquid membrane the transport of an acid gas, e.g. hydrogen sulfide, which is capable of dissolving in water and dissociating, is facilitated by the addition of water-soluble salt $$[M_n{}^{+b}B_m{}^{-a} \text{ and/or } M_n{}^{+b}HB_m{}^{(1-a)}]$$

to the aqueous system, the anion of which reacts reversibly with $H^+$ as follows:

$$H^+M_n{}^{+b}B_m{}^{-a} = nM^{+b} + HB_m{}^{(1-a)}$$

where $nb = ma$. Salts providing any of $CO_3^=$, $HCO_3^-$ and $PO_4^{\equiv}$ are employed by way of example.

BACKGROUND OF THE INVENTION

The removal of hydrogen sulfide from gas streams is an important operation in the natural gas sweetening, oil desulfurization, and coal gasification processes. Many different methods have been developed over the years to effect this separation (A. L. Kohl and F. C. Riesenfeld, *Gas Purification*, McGraw-Hill, Inc., New York [1960]). Invariably, existing separation processes involve extensive and elaborate equipment not only for absorbing the $H_2S$ from a high-pressure gas stream, but also for regenerating the absorbing medium.

This invention is an extension of the application of the phenomenon of facilitated transport in liquid membranes. The application of facilitated transport to the separation of gases by differential permeation through liquid, or quasi-liquid films (e.g. liquid impregnated microporous sheets) is described in U.S. Pat. 3,396,510—Ward et al. (incorporated herein by reference) wherein additive species for the facilitated transport separation of carbon dioxide, sulfur dioxide and oxygen gases are described.

It would be desirable to discover a simple and economical treatment for the removal of hydrogen sulfide from gas mixtures.

SUMMARY OF THE INVENTION

The symbols employed herein are defined as follows:
- $M^{+b}$ _____ Cation of valence "b."
- $B^{-a}$ _____ Polybasic anion of valence "a."
- $HB^{(1-a)}$ _____ Polybasic anion of valence "1−a."
- $n$ _____ Number of cations present in the salt molecule.
- $m$ _____ Defined by the relationship $nb = ma$.

The transport of an acid gas (defined as a gas that will dissociate in an aqueous solution liberating $H^+$) through an immobilized liquid membrane is facilitated by the addition of a water-soluble salt [$M_n{}^{+b}B_m{}^{-a}$ and/or $M_n{}^{+b}HB_m{}^{(1-a)}$] to an aqueous liquid membrane, the anion of $M_n{}^{+b}B_m{}^{-a}$ reacting reversibly with $H^+$ as follows:

$$H^+ + M_n{}^{+b}B_m{}^{-a} = nM^{+b} + HB_m{}^{(1-a)}$$

The facilitated transport of hydrogen sulfide through an aqueous membrane into which salts providing specific ions have been introduced is described herein.

DESCRIPTION OF THE PREFERRED EMBODIMENT

The permeability of a non-porous permselective membrane, e.g. an immobilized liquid membrane (ILM), to a non-reacting gaseous substance is the product of the solubility and the diffusivity of that gas in the membrane material. Using known values of diffusivity and solubility for $H_2S$ in water at 20° (Chemical Engineers Handbook, 3rd edition, McGraw-Hill, Inc. [1950], pages 540, 675) the permeability of an aqueous ILM to $H_2S$ may be calculated and has a value of approximately:

$$400 \times 10^{-9} \, \frac{\text{cc. H}_2\text{S(STP)-cm.}}{\text{cm.}^2\text{-sec.-cm. Hg}}$$

Hydrogen sulfide dissolves in water to a very appreciable extent. At 25° C. and a partial pressure of one atmosphere of $H_2S$, the concentration of $H_2S$ in water is 0.1 moles/liter. However, the dissociation of $H_2S$ in water is very limited. The dissociation of $H_2S$ proceeds according to the following reaction:

$$H_2S = H^+ + HS^- \qquad \text{(Reaction 1)}.$$

At 25° C. with 0.1 mole/liter of $H_2S$ in solution, the concentrations of $H^+$ and $HS^-$ will each be $10^{-4}$ moles/liter. This very small $HS^-$ concentration is not sufficient to provide significant facilitated transport of $H_2S$ through an ILM.

According to the instant invention, by forming an ILM from an aqueous solution containing specific anions, the aid to $HS^-$ transfer so provided tremendously enhances the transport of $H_2S$ across the membrane. Similar ILM's may be prepared for the transfer of other acid gases, e.g. HCN, phenol.

Thus, considering an aqueous solution containing a salt (represented by the general expression $M_n{}^{+b}B_m{}^{-a}$), whose anions are capable of reacting as follows:

$$H_2O + B_m{}^{-a} = HM_m{}^{(1-a)} + OH^- \quad \text{(Reaction 2)},$$

when $H_2S$ dissolves in this solution, $HS^-$ ions will be created according to the following reactions:

$$H_2S + B_m{}^{-a} = HS^- + HB_m{}^{(1-a)} \quad \text{(Reaction 3)}$$

and $$H_2S + OH^- = H_2O + HS^- \quad \text{(Reaction 4)}$$

With such an ILM (prepared from a solution of $M_n{}^{+b}B_m{}^{-a}$) located so as to separate a region of high $H_2S$ partial pressure (on the feed gas side) from a region of low $H_2S$ partial pressure (on the sweep gas side), the facilitated transport of $H_2S$ across the membrane occurs primarily by the following mechanisms:

1. $H_2S$ from the feed gas stream dissolves in the solution of salt $M_n{}^{+b}B_m{}^{-a}$ at the membrane surface;
2. $H_2S$ reacts with $B_m{}^{-a}$ according to Reaction 3 to produce $HB_m{}^{(1-a)}$ and $HS^-$;
3. $H_2S$, $HS^-$ and $HB_m{}^{(1-a)}$ diffuse across the membrane to the sweep gas side;
4. at the sweep gas side of the membrane, $HS^-$ and $HB_m{}^{(1-a)}$ react to produce $H_2S$ and $B_m{}^{-a}$;
5. $B_m{}^{-a}$ diffuses back across the membrane to the feed gas side; and
6. $H_2S$ desorbs from the ILM into the sweep gas stream.

There are several restrictions on the selection of the salt $M_n{}^{+b}B_m{}^{-a}$ which must be present in the ILM. These restrictions are:

1. The concentrations of all species in the ILM must be maintained at less than their respective solubility limits to prevent precipitation of any salts in the membrane.
2. The salt $M_n{}^{+b}B_m{}^{-a}$ must be very soluble so that sufficient $B_m{}^{-a}$ ions are available (i.e. in the case of $H_2S$ to force Reaction 3 far to the right side of the equation, thus generating many $HS^-$ ions).

3. The equilibrium constant for Reaction 2 must be compatible with the ionization constant for the acid gas. Thus, for $H_2S$ this compatibility is required so that the equilibrium for Reaction 3 will lie far on the right side of the equation at the feed gas side of the membrane and will lie far on the left side of the equation at the sweep gas side of the ILM.

containing potassium phosphate/potassium biphosphate in solution, and ILM containing potassium carbonate/potassium bicarbonate in solution and (to establish the pronounced enhancement obtained in the flux of $HS^-$ ions) an ILM containing lithium chloride in solution.

Table I shows the average conditions encountered during the experimental runs (salt concentrations represent initial compositions of the ILM's, which are not necessarily the final steady state concentrations):

TABLE I

| | Membrane | | |
|---|---|---|---|
| | $2M\ PO_4^{-3}$ | $1.5M\ CO_3^{-2}/$ $1.5M\ HCO_3^-$ | $6M\ LiCl$ |
| Membrane area, cm.² | 90 | 119 | 126 |
| Membrane thickness, cm | .00121 | 0.0121 | 0.0121 |
| Duration of run, hours | 144 | 40 | 15 |
| System temperature, °C | 20–28 | 20–22 | 20–22 |
| Solution relative humidity, percent | 87 | 85 | 83 |
| Feed stream: | | | |
| 1. Flow rate, cc./sec | 9.7 | 10 | 10 |
| 2. Relative humidity, percent | ≈92 | ≈90 | ≈88 |
| 3. Inlet $H_2S$ concentration, percent | 0.28 | 0.25 | 0.30 |
| 4. Outlet $H_2S$ concentration, percent | 0.08 | 0.08 | ≈0.30 |
| Sweep stream: | | | |
| 1. Flow rate, cc./sec | 11.3 | 11.4 | 10.8 |
| 2. Relative humidity, percent | ≈91 | ≈90 | ≈87 |
| 3. Inlet $H_2S$ concentration, percent | 0.0 | 0.0 | 0.0 |
| 4. Outlet $H_2S$ concentration, percent | 0.17 | ≈0.15 | 0.01 |

4. Finally, the reaction between the acid gas and the $B_m^{-a}$ ions (e.g. Reaction 3 in the case of $H_2S$) must be completely reversible, and the kinetics must be such that the reaction will be very fast in both the forward and reverse directions.

Experiments with $H_2S$ permeation through ILM's containing various salts have established that by introducing into the ILM the facilitated transport mechanism of the instant invention, the $H_2S$ permeability can be increased at least 75 times the permeability of $H_2S$ through a non-facilitated ILM.

Such ILM's may be prepared by adding to a liquid $B_m^{-a}$ and/or $HB_m^{1-a}$ wherein these anions are either inorganic or organic. Of the inorganic anions tested the phosphate, carbonate and bicarbonate anions have been found very useful for the facilitated transport of $H_2S$. The potassium salts of these ions are preferred, because of their high solubility. Organic salts useful for facilitated $H_2S$ transport are the potassium salt of diethylglycine and the potassium salt of dimethylglycine. In the case of ILM's for $H_2S$ transport the pH should be in the range of from about 9 to about 11.

In one embodiment, the ILM comprises a matrix layer having interconnecting micropores, which pores are occupied by the aqueous solution. The microporous matrix must, of course, be made of a hydrophilic material (i.e. wet by the particular solution employed). Examples of commercially available microporous materials useful for this purpose are those sold under the trademarks "Solvinert" and "Acropor." ILM's may, of course, be packaged as, for example, by the method shown in U.S. 3,574,819—Neulander et al. (incorporated by reference).

Another embodiment of this invention would support the ILM on a hydrophobic microporous membrane.

Solutions used to make ILM's for the practice of this invention were prepared from distilled water and reagent grade $K_2CO_3$, $K_3PO_4$ or a mixture of $K_2CO_3$ and $KHCO_3$. In the case of the $CO_3^{-2}/HCO_3^-$ system, it is necessary to maintain a proper carbon dioxide partial pressure in the feed gas stream in contact with the membrane to prevent substantial depletion of the $HCO_3^-$ ion, which is required in the system to accomplish proton ($H^+$) transfer across the ILM.

All feed gas streams were humidified to proper water vapor content by passing them through water-filled saturaters, which almost completely saturated the gas. This precaution was taken in order to prevent drying out of the ILM's. Experiments were conducted with an ILM The measured permeability for the potassium phosphate/biphosphate ILM was about $$33,000 \times 10^{-9} \frac{\text{cc. } H_2S(STP)\text{-cm.}}{\text{cm.}^2\text{-sec.-cm. Hg}}.$$

Observed values of permeability for the potassium carbonate/bicarbonate ILM were in the range of about $$20,000 - 25,000 \times 10^{-9} \frac{\text{cc. } H_2S(STP)\text{-cm.}}{\text{sec.-cm.}^2\text{-cm. Hg}}.$$

These permeation constants are believed to be the highest values ever achieved for a non-porous membrane and establish that this transport mechanism is truly diffusion limited, rather than reaction rate limited as is the case for facilitated $CO_2$ transport as described in U.S. 3,396,510.

Table II displays a comparison of permeability to $H_2S$ for a number of different membranes.

TABLE II*

| Membrane | $Pr \times 10^9\ \dfrac{\text{cc. } H_2S(STP)\text{-cm.}}{\text{sec.-cm.}^2\text{-cm. Hg}}$ | $H_2S/CO_2$ separation factor |
|---|---|---|
| $2M\ K_3PO_4$ ILM | ≈33,000 | ≈330 |
| $0.8M\ K_2CO_3/0.8M\ KHCO_3$ ILM | ≈20,000 | ≈200 |
| Dimethyl silicone rubber | 1,000 | 3 |
| $6M\ LiCl$ ILM | 430 | — |

*Salt concentrations represent initial compositions of the ILM's, which are not necessarily the final steady state concentrations.

Lithium chloride does not exercise any facilitation function in $H_2S$ transport (the requisite reaction between $H_2S$ and $Cl^-$ does not occur), and since (as seen in Table II) the measured value of $H_2S$ permeability therethrough was $$430 \times 10^{-9} \frac{\text{cc. } H_2S(STP)\text{-cm.}}{\text{sec.-cm.}^2\text{-cm. Hg}},$$

it may be concluded that the $H_2S$ flux in the potassium phosphate/potassium biphosphate and potassium carbonate/potassium bicarbonate systems was in each case tremendously enhanced by the increased flux of $HS^-$ ions. The vast difference between the values of permeability indicated for the various membranes also confirms that for practical purposes the entire $H_2S$ flux in the facilitated transport ILM may be considered to be due to the $HS^-$ ion transport.

In the case of the ILM's of this invention, all of the reactions occur instantaneously whereby the net $H_2S$ transport is diffusion-controlled and not reaction rate controlled.

In the case of the carbonate/bicarbonate ILM, the average distribution of $HCO_3^-$ and $CO_3^=$ will be determined by the average partial pressure of $CO_2$ on both sides of the film and this average value of partial pressure of $CO_2$ should be such that the concentration of $HCO_3^-$ and $CO_3^=$ will be of the same order of magnitude (e.g. $CO_2$ partial pressure of the order of 0.01 atmosphere at 23° C.). Due to the $H_2S$ pressure difference across the film, significant concentration gradients in $HCO_3^-$ and $CO_3^=$ are established in the ILM and, fortunately, these gradients will not be altered significantly by the presence of $CO_2$ adjacent the membrane, because the hydrolysis of $CO_2$ is a slow reaction relative to the speed of diffusion in the system.

In the absence of $CO_2$ in the feed gas mixture, one must either add $CO_2$ gas to the system as indicated above or employ different facilitating species, e.g. the phosphate/biphosphate system.

What we claim as new and desire to secure by Letters Patent of the United States is:

1. In a method for the separation of a given gas from a mixture of gases by bringing the mixture into contact with one side of an immobilized liquid membrane under a partial pressure differential in said given gas across said membrane, the liquid of said membrane being impregnated with a soluble non-volatile carrier specie reversibly chemically reactive with said given gas and productive of a non-volatile material soluble therein, the improvement comprising:

(a) said mixture of gases containing hydrogen sulfide and
   (b) the liquid of said membrane being an aqueous solution containing a water soluble salt selected from the group consisting of the potassium salt of dimethylglycine, the potassium salt of diethylglycine and inorganic salts providing anions selected from the sub-group consisting of phosphate, carbonate, bicarbonate and mixtures thereof.

2. The improvement of claim 1 wherein the pH is in the range of from about 9 to about 11.

3. The improvement of claim 1 wherein the mixture of gases contains hydrogen sulfide and carbon dioxide and separation is effected therebetween.

References Cited

UNITED STATES PATENTS

| | | | |
|---|---|---|---|
| 3,396,510 | 8/1968 | Ward III et al. | 55—16 |
| 2,157,879 | 5/1939 | Zublin | 423—223 |

EARL C. THOMAS, Primary Examiner

U.S. Cl. X.R.

423—223, 226, 232, 236, 245; 55—16